United States Patent Office 3,450,684
Patented June 17, 1969

3,450,684
FLUOROCARBON POLYETHERS
Robert Albert Darby, Vienna, W. Va., assignor to E. I. du Pont de Nemours and Company, Wilmington, Del., a corporation of Delaware
No Drawing. Continuation-in-part of application Ser. No. 158,124, Dec. 8, 1961. This application July 24, 1963, Ser. No. 297,241
Int. Cl. C08f *3/34*; C07c *43/14*
U.S. Cl. 260—87.5         17 Claims

ABSTRACT OF THE DISCLOSURE

Fluorocarbon ethers of the formula $$XCF_2CF_2(OCFXCF_2)_nOCF=CF_2$$

or $$CF_2=CFO(CF_2CFXO)_l(CF_2)_m(OCFXCF_2)_pOCF=CF_2$$

wherein X is F, Cl, H, $CF_2H$, $CF_2Cl$, or $CF_3$, $n$ is at least 1, $m$ is at least 2, the sum of $l$ and $p$ is at least 1 and the total number of carbon atoms does not exceed 24 and polymers of these fluorocarbon ethers and copolymers thereof with other monomers, as well as the free radical polymerization of these fluorocarbon ethers.

---

The present invention relates to novel fluorocarbon polyethers and to polymerization products thereof.

The novel fluorocarbon polyethers of the present invention have the general formulas $$XCF_2CF_2(OCFXCF_2)_nOCF=CF_2$$

and

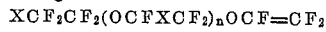
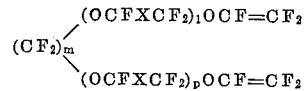

where X is a member of the class consisting of fluorine, chlorine, hydrogen, the difluoromethyl group, the chlorodifluoromethyl group and the perfluoromethyl group, $n$ is an integer of at least one, $m$ is an integer of at least two and the sum $l$ and $p$ is an integer of at least one, the total number of carbon atoms in the vinyl ether not to exceed 24.

The novel fluorocarbon compounds of the present invention can be prepared in several ways which are illustrated by the following reaction equations, where X and $n$ have the same meaning as above and where MeOH is an alkali metal hydroxide.

(1)
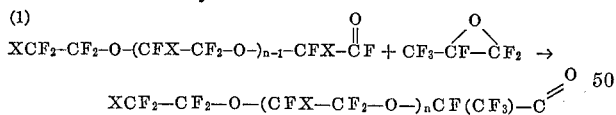

(2)
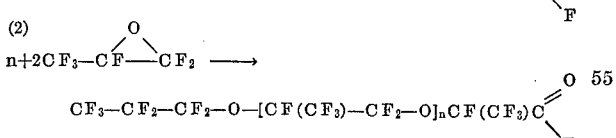

(3)
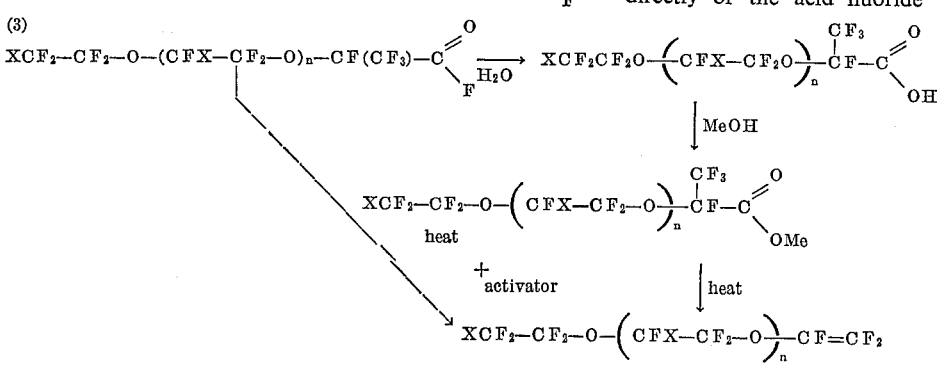

The fluorocarbon ether employed in reaction (1) is obtained by the polymerization of epoxides of tetrafluoroethylene, hexafluoropropylene, chlorotrifluoroethylene, etc. This ether is reacted with hexafluoropropylene epoxide to result in a polyether of a higher degree of polymerization which contains a pendent trifluoromethyl group on the carbon atom in the α-position to the carbonyl group. Where X is a trifluoromethyl group, the same product can also be obtained by the direct polymerization of hexafluoropropylene epoxide as illustrated in reaction Equation 2. The acid fluoride obtained by reactions (1) and (2) is hydrolyzed to the acid, converted to a monovalent metal salt, and then heated to result in the perfluorovinyl ether. The acid fluoride may also be directly pyrolyzed to the perfluorovinyl ether in the presence of an activator such as zinc oxide or silica (Equation 3). The acid fluoride may also be directly hydrolyzed to the salt.

The divinyl ethers of the present invention can be prepared in the same way from the corresponding diacid fluoride intermediates which have the general formula

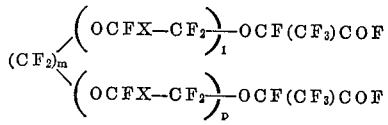

where $l$, $m$ and $p$ have the above-indicated meaning These intermediates are prepared by reaction of diacid difluorides such as oxalyl difluoride and perfluorinated alkandioic acids with hexafluoropropylene epoxide under conditions where more than two epoxide units add to the diacid difluoride or by the sequential reaction of the diacid difluoride with epoxides having the general formula

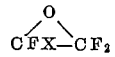

followed by reaction with hexafluoropropylene epoxide. The sequential reaction of different epoxides can, of course, also be employed to make the necessary monovinyl ether intermediates.

The reaction of the hexafluoropropylene epoxide with the monoacid fluoride (reaction Equation 1) or with the diacid difluoride is carried out in bulk using active carbon as the catalyst or by reaction in a polar solvent using an alkali metal or quaternary ammonium fluoride catalyst. The solvents suitable in the preparation of the α-substituted acid fluoride by the latter technique are nitriles and polyalkyl ethers liquid at reaction temperatures. Examples of these solvents are the dimethyl ether of ethylene glycol, the dimethyl ether of diethylene glycol, benzonitrile, acetonitrile, etc. Other highly polar solvents which have no active hydrogen are also useful in the process. These solvents include dimethyl sulfoxide and N-methyl pyrrolidone (reaction Equations 1 and 2). The pyrolysis may be carried out with the acid fluoride directly or the acid fluoride can be converted into a monovalent metal salt such as the alkali metal salt of the acid and then pyrolyzed to the vinyl ether. The hydrolysis is carried out by contacting the acid fluoride with water. The formation of the alkali metal salt, for example, is accomplished by carrying out the hydrolysis in the presence of alkali metal base, such as KOH. The acid fluoride is generally pyrolyzed in gaseous form by passage through a reaction zone maintained at temperatures of 300 to 600° C. In the presence of certain activators such as oxygen-containing sodium salts, the pyrolysis may be carried out at somewhat lower temperatures. The pyrolysis of the alkali metal salts is carried out at temperatures of 170° C. to 250° C. In the presence of the prior solvents described above, the pyrolysis may be carried out at temperatures as low as 100° C.

The resulting vinyl ethers are useful as monomers which are capable of homopolymerizing as well as capable of forming high molecular weight copolymers with tetrafluoroethylene, chlorotrifluoroethylene, vinylidene fluoride and similar vinyl monomers. In this respect, the perfluorovinyl ethers are different from perfluoroolefins of similar molecular weight and carbon numbers which have not been homopolymerized. The vinyl ethers are polymerized through addition to the double bond. The homopolymers of the perfluorovinyl ethers of the present invention have the general formulas

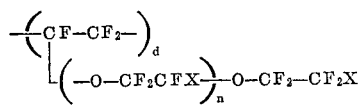

and

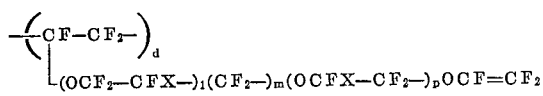

where $d$ is the degree of polymerization and where the remaining symbols have the above-indicated meanings. In the polymerization of the vinyl ether, polymer formation readily extends to the second vinyl group to give rise to insoluble network type polymers.

Various means may be employed to accomplish the polymerization of the perfluorovinyl ethers of the present invention. In general, the polymerization is initiated by a free radical forming compound in the presence of an inert diluent such as water or a fluorocarbon solvent. Where the perfluorovinyl ether is liquid at reaction conditions, the polymerization may be in bulk. A preferred polymerization system comprises a perfluorinated free radical initiator such as a perfluorinated peroxide or a perfluorinated azo compound in combination with a perfluorinated, saturated, aliphatic hydrocarbon or ether. The polymerization of the novel monomers of the present invention may also be carried out by means of actinic radiation. The polymerization of fluorocarbon monomers with such systems is described, for example, in U.S. Patent 2,952,669, issued Sept. 13, 1960 to M. I. Bro, and in U.S. Patent 2,963,468, issued Dec. 6, 1960, to C. S. Cleaver. Suitable initiators are also described in U.S. Patent 2,559,630, issued to O. H. Bullitt on July 10, 1951, for example. Suitable fluorocarbon solvents include perfluorodimethylcyclobutane, perfluorocyclohexane, perfluoroheptane, perfluorokerosenes, perfluorodiethyl ether, perfluorodimethylcyclohexane, etc. The polymerization can be carried out at temperatures ranging from below 0° to 250° C. and pressures ranging from atmospheric pressure to pressures of several thousand atmospheres.

The preparation of the novel compounds of the present invention is further illustrated by the following examples.

EXAMPLE I

To 1000 ml. of water was added 596 g. of the trimer of hexafluoropropylene epoxide in acid form having the formula

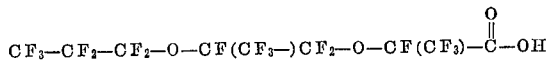

The resulting mixture was titrated with 20% aqueous NaOH solution until a pH of 10 was obtained. The sodium salt was isolated by evaporation and carefully dried. A total of 508 g. of the dry salt was obtained. The resulting salt was pyrolyzed at 200° to 275° C. in 150 g. batches in a one liter flask at 2–4 mm. Hg pressure. The resulting perfluorovinyl ether was distilled. There was obtained 160 g. of the perfluorovinyl ether having the formula $$CF_3-CF_2-CF_2-O-CF(CF_3)-CF_2-O-CF=CF_2$$

and a boiling point at 103° C.

EXAMPLE II

A 100 ml. stainless steel autoclave was flushed with nitrogen and evacuated. A solution of 3.3 g. (0.0076 mol) of the perfluorovinyl ether of Example I, having the formula $$CF_3CF_2-CF_2-O-CF(CF_3)-CF_2-O-CF=CF_2$$

dissolved in 76 ml. of perfluorodimethylcyclobutane was placed in the autoclave. The contents of the autoclave were heated to 75° C. with vigorous agitation, whereupon tetrafluoroethylene was admitted into the autoclave until a pressure of 205 p.s.i. was attained. Then, approximately $10^{-3}$ moles of dinitrogen difluoride, $$N_2F_2$$

diluted with nitrogen, was added. Tetrafluoroethylene was periodically added to maintain the initial pressure. After 45 minutes, the autoclave was cooled to room temperature and vented. Solid white copolymer, weighing 13.7 g. after drying, was obtained. The resin had a melt viscosity of $9.9 \times 10^4$ poises at 380° C. The resin could be compression molded into clear, tough, colorless films at 340° C. and 20,000 p.s.i. platen pressure. Infrared analysis of the films indicated that 5.0% by weight of the perfluorovinyl ether was incorporated in the copolymer.

EXAMPLE III

Into a Carius tube was placed 8 g. of the perfluorovinyl ether described in Example I and 10 mg. of perfluoroazobutane, $C_4F_9N=NC_4F_9$. The contents of the tube were cooled in Dry Ice, flushed with nitrogen and evacuated. The tube was then sealed and the vinyl ether was irradiated by means of a mercury ultraviolet lamp powered by a 7500 volt step up transformer for seven days. The resulting reaction mixture was heated at a reduced pressure of 2 to 4 mm. Hg, until no distillate was evolved. The residual viscous colorless oil weighed 4 g. Analysis by nuclear magnetic resonance and infrared spectroscopy verified the structure of the oil to be a homopolymer having the following general formula

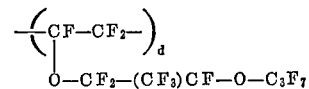

where $d$ is the degree of polymerization.

EXAMPLE IV

Potassium perfluoro-2-(2-n-propoxy)propoxypropionate, 98.5 g., was pyrolyzed at ca. 2 mm. Hg pressure for 25 hours at 212° C. The product, perfluoro-2-n-propoxypropyl perfluorovinyl ether weighed 76 g. The infrared band showed the characteristic vinyl ether absorption band at 5.48μ and the complete absence of hydrogen containing impurities.

EXAMPLE V

Using the procedure of Example I, perfluoro-2-ethoxyethyl perfluorovinyl ether is prepared from the reaction product of the dimer of tetrafluoroethylene epoxide, $CF_3—CF_2—O—CF_2—COF$, and hexafluoropropylene epoxide.

EXAMPLE VI

Into a stainless steel reaction vessel of 80 ml. capacity was charged 15 g. of tetrafluoroethylene, 5 g. of perfluoro-2-n-propoxypropyl perfluorovinyl ether and 40 ml. of a 0.25% aqueous ammonium persulfate solution. The vessel was heated under autogenous pressure at 85° C. for one hour. A solid polymer, which could be molded at 380° C. and 35,000 p.s.i. into tough films, weighing 20 g. was obtained.

EXAMPLE VII

Using the procedure of Example VI, the perfluoro-2-ethoxyethyl perfluorovinyl ether is polymerized to a solid copolymer with tetrafluoroethylene.

EXAMPLE VIII

To one liter of water was added 150 g. of the hexafluoropropylene epoxide tetramer having the formula $$CF_3—CF_2—CF_2—O—[CF(CF_3)—CF_2—O]_2—CF(CF_3)—COF$$

and the resulting mixture was stirred for a period of 24 hours. The resulting acid was separated and neutralized with 25% sodium hydroxide, water being added as necessary to prevent gel formation. The solution was evaporated to dryness, the salt dried for 3 days at 100° C. and then pyrolyzed at a temperature of 212° C. and a pressure of about 2 mm. mercury. There was obtained 120 g. of the tetramer vinyl ether having the structure $$CF_3—CF_2—CF_2—O—[CF(CF_3)—CF_2—O]_2—CF=CF_2$$

The boiling point of the vinyl ether was 150–151° C.

EXAMPLE IX

Into a dry, clean 500 cc. round bottom flask containing a magnetic stirrer and flushed with nitrogen were placed 10 g. of dry cesium fluoride and 55 cc. of dry dimethyl ether of diethylene glycol. There was then added 61 g. of perfluoroglutaryl fluoride. The reaction mixture was cooled to −22° C. and hexafluoropropylene oxide was added with stirring over a 3½ hour period at −22 to −20° C. A total of 225 g. of hexafluoropropylene oxide was added. Fractionation of the crude reaction mixture afforded the following fractions: (1) boiling point 80° at 300 mm. to 110° at 100 mm., 112 cc. (54 cc. dimethyl ether of diethylene glycol plus 58 cc. fluorocarbon layer); (2) boiling point 155° at 100 mm. to 160° at 70 mm., volume 26 cc.; (3) boiling point 160° at 70 mm. to 165° at 40 mm., volume 51 cc.; (4) boiling point 165° at 40 mm. to 172° at 22 mm., volume 31 cc. Fractions 2, 3 and 4 were combined and titrated with standard base to give a neutralization equivalent of 276. This corresponds to a molecular weight of 1104. The calculated molecular weight for a mixture of compounds of structure

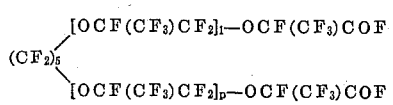

where the sum of $l+p$ is an average of 3, is 1074.

The combined fractions were treated with excess methanol. Excess methanol and hydrogen fluoride were removed under vacuum. Distillation of the fluorocarbon material afforded a series of fractions boiling from 88° at 0.5 mm. to 133° at 0.25 mm. Infrared and nmr. spectra on the components of this mixture obtained by preparative scale gas chromatography showed them to have the structure

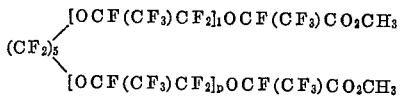

where $l+p$ ranged from 1 to 4. The total weight of esters obtained was 166 g.

The 166 g. of mixed dimethyl esters were diluted with 100 cc. of methanol and titrated with 5 normal potassium hydroxide and methanol to a phenolphthalein end point. Titration required 5 hours to achieve a permanent red color. Excess methanol was removed by vacuum drying for 72 hours at 100° C. and 0.2 mm. pressure. The dry mixed potassium salts were then added slowly to a stainless steel pot containing a magnetic stirrer. The pot temperature was maintained at 255–265° C. and the reactor was maintained at a pressure of 1–10 mm. during the addition. The liquid distillate was caught in a Dry Ice cooled receiver. In this manner there was obtained 101 g. of crude mixed divinyl ethers. Fractionation of the product gave 11.3 g. of the $C_{15}$ divinyl ether of structure

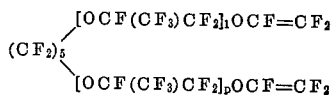

where $l+p=2$, at 98° C. at 6 mm.; 23.6 g. of the $C_{18}$ divinyl ether, boiling point 103° C. at 2 mm. to 112° C. at 2 mm. of similar structure where $l+p=3$; and 21 g. of a mixture of the $C_{18}$ and $C_{21}$ divinyl ethers of similar structures where $l+p=3$, 4, boiling point 110° C. at 2 mm. to 113° C. at 0.3 mm. Each of these fractions was obtained in pure state by preparative scale gas chromatography.

EXAMPLE X

A small glass polymer tube was charged with 2.0 g. of $C_{15}$ divinyl ether of Example IX at −80° C. The material was then degassed at 25° C. and 0.1 mm. After cooling to −80° C. there was introduced 0.07 g. of 2,3-bis(difluoroamino)perfluoro-2-butene. The tube was sealed and heated to 80° C. for 24 hours followed by 16 hours at 160° C. and 6 hours at 220° C. The material had solidified after several hours at 80° C. The resin obtained was clear, colorless and very elastic. No noticeable shrinkage occurred during polymerization. Infrared analysis of the product indicated no residual trifluorovinyl ether groups. The polymer was insoluble in all common solvents.

A similar polymerization using a mixture of the $C_{15}$ and $C_{18}$ divinyl ethers gave a resin with physical properties identical or nearly identical to those of the pure $C_{15}$ divinyl ether. Similar properties were obtained on polymerization of pure $C_{18}$ divinyl ether and $C_{21}$ divinyl ether.

Using the procedures of the foregoing examples, the following perfluorovinyl ethers are prepared:

$$ClF_2C—CF_2—O—CFCl—CF_2—O—CF=CF_2$$

$$HF_2C—CF_2—O—CF_2H—CF_2—O—CF=CF_2$$

$$CF_2H—CF_2—CF_2—O—CF(CF_2H)—$$
$$CF_2—O—CF=CF_2$$

and $$CF_2Cl—CF_2—CF_2—O—CF(CF_2Cl)—$$
$$CF_2—O—CF=CF_2$$

from dimers of the corresponding epoxides by reaction with hexafluoropropylene epoxide.

The high molecular weight, solid polymeric products obtained from the monovinyl ethers of the present invention find utility as plastics in applications involving high use temperatures and/or requiring corrosion resistance. Lower, normally liquid polymers of the perfluorovinyl ethers of the present invention find utility as solvents, lubricants, heat transfer media, dielectric media and, generally, are useful in applications requiring liquids which are stable at elevated temperatures and/or resistant to chemical attack.

The divinyl ether polymers of the present invention are particularly useful as coating resins, casting resins, laminating resins and adhesive resins. Liquid low molecular weight polymers or soluble polymers can be formed by polymerizing the divinyl ethers under mild conditions. The resulting resin can be cast or coated on substrates and polymerized to crosslinked, solid structures by heating at elevated temperatures.

The preferred perfluorovinyl ethers of the present invention are those which contain from one to five fluorinated alkoxy groups. These perfluorovinyl ethers are preferred since they are obtained from starting materials more readily available and more economic and on polymerization give rise to products which exhibit the same outstanding properties obtained with the perfluorovinyl ethers having a higher number of perfluoroalkoxy groups.

The copolymerization of the perfluoromonovinyl ethers of the present invention with tetrafluoroethylene or similar monomers results in copolymers which have a significantly lower melt viscosity as compared to the melt viscosity of the homopolymer, such as polytetrafluoroethylene, even when employed in concentrations of one or two weight percent, without causing any significant sacrifice in other desirable properties. In contrast to polytetrafluoroethylene, for example, which cannot be readily fabricated by melt extrusion or injection molding, the copolymers of tetrafluoroethylene containing small amounts of the perfluorovinyl ethers of the present invention are readily fabricated by these techniques. The copolymerization of the perfluorodivinyl ethers of the present invention with tetrafluoroethylene or similar monomers under mild conditions results in unsaturated copolymers which, can be made to crosslink subsequently by applying more rigorous conditions than applied in their preparation.

This application is a continuation-in-part of application Ser. No. 158,124, filed Dec. 8, 1961, now abandoned.

I claim:

1. A perfluorovinyl ether having a formula selected from the group consisting of

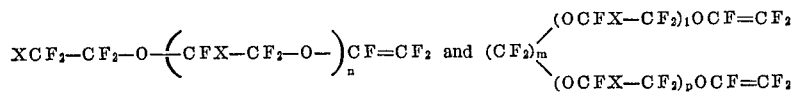

where X is a member of the class consisting of fluorine, chlorine, hydrogen, the difluoromethyl group, the chlorodifluoromethyl group and the perfluoromethyl group, $n$ is an integer of at least one, $m$ is an integer of at least two and the sum of $l$ and $p$ is an integer of at least one, said vinyl ether containing up to 24 carbon atoms inclusive.

2. A perfluorovinyl ether having the general formula $$CF_3-CF_2-CF_2-O[CF(CF_3)-CF_2-O]_nCF=CF_2$$

where $n$ is an integer of one to five.

3. A perfluorovinyl ether having the formula $$CF_3-CF_2-CF_2-O-CF(CF_3)-CF_2-O-CF=CF_2$$

4. A perfluorovinyl ether having the formula $$CF_3-CF_2-CF_2-O[CF(CF_3)-CF_2-O]_2-CF=CF_2$$

5. A perfluorovinyl ether having the general formula $$CF_3-CF_2-O[CF_2-CF_2-O]_n-CF=CF_2$$

where $n$ is an integer of one to five.

6. A perfluorovinyl ether having the formula $$CF_3-CF_2-O-CF_2-CF_2-O-CF=CF_2$$

7. The addition polymer of a perfluorovinyl ether having the general formula $$CF_3-CF_2-O-(CF_2-CF_2-O-)_nCF=CF_2$$

said polymer containing units of the formula

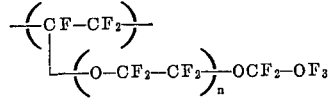

where $n$ is an integer of one to five inclusive.

8. The addition polymer of a perfluorovinyl ether having the formula $$CF_3-CF_2-CF_2-O[CF(CF_3)-CF_2-O]_nCF=CF_2$$

said polymer containing units of the formula

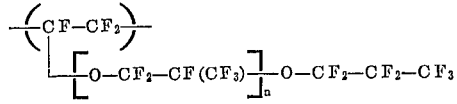

where $n$ is an integer of one to five inclusive.

9. The addition polymer of the perfluorovinyl ether having the formula $$CF_3-CF_2-CF_2-OCF(CF_3)-CF_2-O-CF=CF_2$$

said polymer containing units of the formula

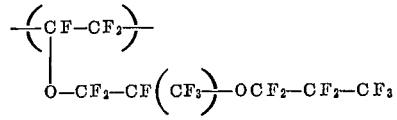

10. A solid copolymer of tetrafluoroethylene and a perfluorovinyl ether having the general formula $$CF_3-CF_2-CF_2-O[CF(CF_3)-CF_2-O]_nCF=CF_2$$

where $n$ is an integer of one to five.

11. A solid copolymer of tetrafluoroethylene and a perfluorovinyl ether having the formula $$CF_3-CF_2-CF_2-O-CF(CF_3)-CF_2-O-CF=CF_2$$

12. The process of polymerizing a perfluorovinyl ether having the general formula $$XCF_2-CF_2-O(CFX-CF_2-O)_nCF=CF_2$$

where X is a member of the class consisting of fluorine, chlorine, hydrogen, the difluoromethyl group, the difluorochloromethyl group and the trifluoromethyl group, and $n$ is an integer of one to five, which comprises contacting said perfluorovinyl ether with a free radical forming compound at a temperature of from about 0° C. to about 250° C. and a pressure of at least about atmospheric pressure.

13. A perfluorovinyl ether having the general formula

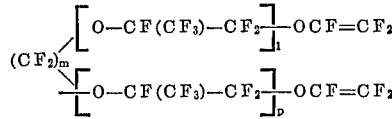

where $m$ is an integer of at least two and the sum of $l$ and $p$ is an integer of at least one, said perfluorovinyl ether having up to 24 carbon atoms inclusive.

14. A perfluorovinyl ether having the general formula

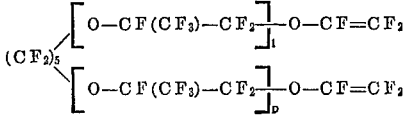

where the sum of $l$ and $p$ is an integer from 2 to 4 inclusive.

15. The addition polymer of a perfluorovinyl ether having the formula

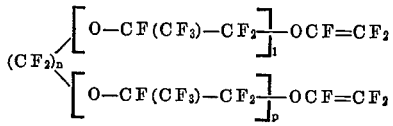

where $n$ is an integer of at least two and the sum of $l+p$ is an integer of at least one, said perfluorovinyl ether having up to 24 carbon atoms, said polymer containing units of the formula

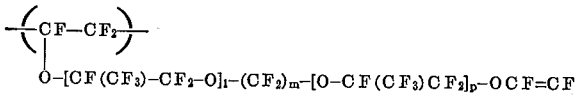

16. The process of polymerizing a perfluorovinyl ether having the formula

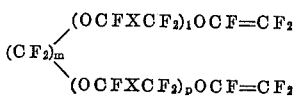

where X is a member of the class consisting of fluorine, chlorine, hydrogen, the difluoromethyl group, the difluorochloromethyl and the trifluoromethyl group, $m$ is an integer of at least two, the sum of $l$ and $p$ is an integer of at least one, said perfluorovinyl ether containing up to 24 carbon atoms inclusive, which comprises contacting said perfluorovinyl ether with a free radical forming compound at a temperature of from about 0° C to about 250° C. and a pressure of at least about atmospheric pressure.

17. The addition polymer of claim 15 in said cross-linked form, said polymer containing units of the structure

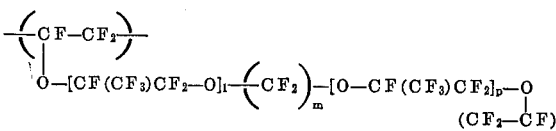

References Cited

UNITED STATES PATENTS

| | | |
|---|---|---|
| 2,500,388 | 3/1950 | Simons. |
| 2,883,429 | 4/1959 | Haszeldine. |
| 3,114,778 | 12/1963 | Fritz et al. _____ 260—91.1 XR |
| 3,125,599 | 3/1964 | Warnell. |
| 3,214,478 | 10/1965 | Milian _____ 260—91.1 XR |
| 3,242,218 | 3/1966 | Miller. |

JOSEPH L. SCHOFER, *Primary Examiner.*

J. A. DONAHUE, JR., *Assistant Examiner.*

U.S. Cl. X.R.

260—987.7, 91.1, 614, 615

PO-1050
(5/69)

UNITED STATES PATENT OFFICE
CERTIFICATE OF CORRECTION

Patent No. 3,450,684      Dated June 17, 1969

Inventor(s) Robert Albert Darby

It is certified that error appears in the above-identified patent and that said Letters Patent are hereby corrected as shown below:

Column 8, claim 7, line 6, "$OF_3$" should read -- $CF_3$ --. Col. 9, claim 15, last line, "OCF=CF" should read -- $OCF=CF_2$ --. Column 10, claim 17, line 1, "said" should read -- solid --.

SIGNED AND
SEALED
FEB 24 1970

(SEAL)
Attest:

Edward M. Fletcher, Jr.
Attesting Officer

WILLIAM E. SCHUYLER, JR.
Commissioner of Patents